United States Patent
Roth

(10) Patent No.: US 11,741,322 B2
(45) Date of Patent: Aug. 29, 2023

(54) METHOD FOR MISSED ITEM RECOVERY IN RFID TUNNEL ENVIRONMENTS

(71) Applicant: Avery Dennison Retail Information Services LLC, Mentor, OH (US)

(72) Inventor: Mark Roth, North Miami, FL (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 17/620,907

(22) PCT Filed: Jul. 15, 2020

(86) PCT No.: PCT/US2020/042037
§ 371 (c)(1),
(2) Date: Dec. 20, 2021

(87) PCT Pub. No.: WO2021/011593
PCT Pub. Date: Jan. 21, 2021

(65) Prior Publication Data
US 2022/0318532 A1 Oct. 6, 2022

Related U.S. Application Data

(60) Provisional application No. 62/874,180, filed on Jul. 15, 2019.

(51) Int. Cl.
*G06K 7/00* (2006.01)
*G06K 7/10* (2006.01)

(52) U.S. Cl.
CPC ....... *G06K 7/10445* (2013.01); *G06K 7/0008* (2013.01)

(58) Field of Classification Search
CPC .................. G06K 7/10445; G06K 7/0008
See application file for complete search history.

(56) References Cited

U.S. PATENT DOCUMENTS

| | | | |
|---|---|---|---|
| 5,266,785 A | * | 11/1993 | Sugihara ............... G07B 15/063 235/382 |
| 6,195,006 B1 | * | 2/2001 | Bowers .................. G06K 17/00 340/568.1 |

(Continued)

FOREIGN PATENT DOCUMENTS

| CN | 110023974 | 7/2019 |
|---|---|---|
| EP | 1643413 | 4/2006 |

OTHER PUBLICATIONS

International Preliminary Report on Patentability dated Jan. 18, 2022 issued in corresponding IA No. PCT/US2020/042037 filed Jul. 15, 2020.

(Continued)

*Primary Examiner* — Quang Pham

(57) ABSTRACT

A method for recovering missed RFID tagged items in an RFID tunnel environment is disclosed. The method comprises using a dynamic RFID tunnel system comprised of a first RFID tunnel and a second RFID tunnel to inventory one or more containers of items having RFID tags. A first RFID read of the one or more containers is performed in the first RFID tunnel and compared to an expected containers' inventory stored in a database. If the comparison does not match, a second RFID read of the containers is performed in a second, subsequent RFID tunnel at a higher RFID read power and by moving the containers at a speed slower than a speed of movement of the containers into the first RFID tunnel. If a comparison of the second read to the expected containers' inventory still does not match, the containers may be recirculated through the tunnel system or may be diverted to an exceptions audit depending on how the system is configured.

18 Claims, 6 Drawing Sheets

(56) References Cited

U.S. PATENT DOCUMENTS

| | | | | |
|---|---|---|---|---|
| 7,513,425 B2* | 4/2009 | Chung | | G08B 13/2477 235/382 |
| 7,576,650 B1* | 8/2009 | Ghaffari | | G06K 7/10079 340/572.1 |
| 7,710,275 B2* | 5/2010 | Phillips | | G06Q 10/087 340/572.7 |
| 8,902,046 B2* | 12/2014 | Torabi | | G06K 7/10445 340/10.1 |
| 9,183,717 B1* | 11/2015 | Diorio | | G08B 13/2474 |
| 9,760,826 B1* | 9/2017 | Stine | | G06K 7/10079 |
| 9,928,481 B1* | 3/2018 | Russell | | G06K 19/07758 |
| 10,331,923 B2* | 6/2019 | Roth | | G06K 7/10435 |
| 10,372,951 B2* | 8/2019 | Forster | | G06K 7/10445 |
| 10,565,410 B1* | 2/2020 | Shmulevich | | G06K 7/10356 |
| 2002/0161675 A1* | 10/2002 | Kawase | | G06Q 10/0875 340/870.1 |
| 2003/0054805 A1* | 3/2003 | Fujisawa | | H02J 7/1407 455/414.1 |
| 2003/0075416 A1* | 4/2003 | Prutu | | G01G 19/005 198/370.1 |
| 2004/0213177 A1* | 10/2004 | Moritani | | H04L 45/851 370/328 |
| 2005/0093702 A1* | 5/2005 | Twitchell, Jr. | | H04L 69/329 340/572.8 |
| 2005/0093703 A1* | 5/2005 | Twitchell, Jr. | | H04L 67/564 340/572.8 |
| 2005/0215280 A1* | 9/2005 | Twitchell, Jr. | | G06K 7/10079 455/73 |
| 2006/0022826 A1* | 2/2006 | Higham | | G06Q 10/087 340/572.1 |
| 2006/0176152 A1* | 8/2006 | Wagner | | G06K 7/0008 340/10.2 |
| 2007/0030125 A1* | 2/2007 | Friedrich | | G06K 19/0716 340/572.7 |
| 2007/0194921 A1* | 8/2007 | Watanabe | | G06K 17/00 340/572.1 |
| 2007/0285242 A1* | 12/2007 | Higham | | G06Q 10/087 340/572.1 |
| 2008/0001748 A1* | 1/2008 | Childress | | G06K 17/00 700/214 |
| 2008/0121537 A1* | 5/2008 | Sankaran | | B65B 43/123 206/223 |
| 2008/0157977 A1* | 7/2008 | Hori | | G06K 7/0008 340/572.7 |
| 2009/0232138 A1* | 9/2009 | Gobara | | H04L 12/66 370/392 |
| 2009/0259528 A1* | 10/2009 | Ebersberger | | G06Q 30/0284 705/13 |
| 2010/0082152 A1* | 4/2010 | Mishra | | G06Q 10/08 700/226 |
| 2010/0127875 A1* | 5/2010 | Wong | | G06Q 50/30 340/8.1 |
| 2012/0075080 A1* | 3/2012 | Ohuchi | | G06K 7/0008 340/10.51 |
| 2012/0187194 A1* | 7/2012 | Svetal | | G07G 1/01 235/470 |
| 2012/0205448 A1* | 8/2012 | Hoskinson | | G06K 7/1098 235/440 |
| 2012/0212327 A1* | 8/2012 | Torabi | | G06K 7/10099 340/10.1 |
| 2013/0148143 A1* | 6/2013 | Ooyanagi | | H04N 1/00015 358/1.14 |
| 2013/0175339 A1* | 7/2013 | Svetal | | G07G 1/14 235/383 |
| 2013/0342676 A1* | 12/2013 | Amano | | G07F 9/026 348/86 |
| 2014/0027511 A1* | 1/2014 | Plocher | | G06K 7/10 235/439 |
| 2016/0321481 A1* | 11/2016 | Bottazzi | | G06K 17/00 |
| 2016/0372223 A1* | 12/2016 | Splinter | | G21F 3/00 |
| 2017/0259376 A1* | 9/2017 | Beransky | | B23K 26/0838 |
| 2018/0004991 A1* | 1/2018 | Jacobsen | | G06K 7/10435 |
| 2018/0004992 A1* | 1/2018 | Jacobsen | | B65G 43/08 |
| 2018/0157446 A1* | 6/2018 | Fukuda | | G06K 15/16 |
| 2018/0157873 A1* | 6/2018 | Roth | | G06K 7/10366 |
| 2018/0157879 A1* | 6/2018 | Forster | | G06K 7/10445 |
| 2018/0333964 A1* | 11/2018 | Sawamura | | B41J 2/475 |
| 2018/0350646 A1* | 12/2018 | Honda | | H01L 21/67754 |
| 2018/0358252 A1* | 12/2018 | Honda | | H01L 21/67724 |
| 2019/0113464 A1* | 4/2019 | Tingle | | G01N 21/8803 |
| 2019/0283181 A1* | 9/2019 | Beransky | | B23K 26/0838 |

OTHER PUBLICATIONS

International Search Report and Written Opinion dated Oct. 14, 2020 issued in corresponding IA No. PCT/US2020/042037 filed Jul. 15, 2020.

* cited by examiner

METHOD FOR MISSED ITEM RECOVERY IN RFID TUNNEL ENVIRONMENTS

CROSS REFERENCE TO RELATED APPLICATION(S)

The present application is a 371 of International Application No. PCT/US2020/042037, which was published in English on Jan. 21, 2021, and claims the benefit of U.S. Provisional Patent Application No. 62/874,180 filed Jul. 15, 2019, both of which are incorporated herein by reference in their entireties.

BACKGROUND

The present invention relates generally to a method for recovering missed items in RFID tunnel environments and, more specifically, to an apparatus and a method of optimizing a RFID tunnel system with a supplemental read solution to pick up difficult to read RFID inlays packed among other inlays within a specific carton or container. The method of the present invention utilizes unique software filtering techniques and intelligent decision making processes to utilize a secondary RFID tunnel read to achieve a higher successful RFID inlay read percentage. Accordingly, the present specification makes specific reference thereto. However, it is to be appreciated that aspects of the present invention are also equally amenable to other like applications and devices.

Generally stated, radio-frequency identification is the use of electromagnetic energy to stimulate a responsive device (known as an RFID "tag" or transponder) to identify itself and, in some cases, provide additional information and/or data stored in the tag. RFID tags typically comprise a semiconductor device commonly referred to as the "chip", upon which are formed a memory and an operating circuitry, which is connected to an antenna. Typically, RFID tags act as transponders, providing information stored in the chip memory in response to a radio frequency interrogation signal received from a reader, also referred to as an interrogator. In the case of passive RFID devices, the energy of the interrogation signal also provides the necessary energy to operate the RFID tag device.

RFID tags may be incorporated into or attached to articles that a user wishes to later identify and/or track. In some cases, the RFID tag may be attached to the outside of the article with a clip, adhesive, tape, or other means and, in other cases, the RFID tag may be inserted within the article, such as being included in the packaging, located within the container of the article or plurality of articles, or sewn into a garment. Further, RFID tags are manufactured with a unique identification number which is typically a simple serial number of a few bytes with a check digit attached. This identification number is typically incorporated into the RFID tag during its manufacture. With such RFID tags, the user cannot alter this serial/identification number, and manufacturers guarantee that each RFID tag serial number is used only once and is, therefore, unique. Such read-only RFID tags typically are permanently attached to an article to be identified and/or tracked and, once attached, the serial number of the tag is associated with its host article in a computer database. Alternatively, programmable RFID tags are available, on which an EPC data string can be imparted into memory.

Typically, an item can be affixed with a specific RFID tag unique to the item. The RFID reader can then be employed to read the RFID tag to determine if a particular item is amongst a larger group of items. For example, in a product tracking scenario, unique RFID tags may be affixed to a number of products. A user looking for a particular product may use an RFID reader to communicate with that product's unique RFID tag. More specifically, the RFID reader is capable of determining whether the sought after product is present in a particular area, such as within a carton or other container.

In RFID environments, identifying RFID tagged items that were missed after an initial RFID read can be both time consuming and frustrating. More specifically, capturing and tracking otherwise valid RFID inlays that are missed among other RFID inlays in a carton or container after an initial RFID read can lead to production and supply chain delays as the entire carton or container must then be manually checked for accuracy and completeness. Additionally, because cartons containing products with an RFID tag flow through RFID tunnels at relatively high rates and volumes, it is possible to miss fully energized and viable RFID inlays as they pass through the RFID tunnel. More specifically, RFID reader tunnels are typically tuned to lower power settings to allow for selectivity of specific cartons and the contents contained therein, and, because the cartons pass through the RFID tunnel at relatively high speeds, the RFID inlays may not have adequate time to energize before departing the RF field of influence inside the RFID tunnel. Additionally, running RFID readers at higher power settings in automated scanning environments can also result in extraneous and unintended RFID reads, which are also undesirable.

One possible solution to reduce unintended RFID reads is through the use of physical or electromagnetic shielding to prevent unwanted RFID signal transmission. More specifically, electromagnetic shielding is the practice of reducing the electromagnetic field in a space by blocking the field with barriers made of conductive or magnetic materials. Electromagnetic shielding that blocks radio frequency electromagnetic radiation is also known as RF shielding. RF shielding can reduce the coupling of RF waves, electromagnetic fields, and electrostatic fields. The amount of reduction is directly related to the shielding material used, its thickness, the size of the shielded volume and the frequency of the fields of interest and the size, shape and orientation of apertures in a shield to an incident electromagnetic field.

Typical materials used for electromagnetic shielding include sheet metal, metal screen, and metal foam, each of which can be expensive and time consuming to install. Further, any holes or openings in the shield or mesh must be significantly smaller than the wavelength of the radiation that is being kept out, or the enclosure will not function effectively or approximate an unbroken conducting surface. Copper is typically used for radio frequency shielding because it is capable of absorbing both radio and electromagnetic waves. Electromagnetic or physical shielding, such as metal foils or metallic paints, can be installed or applied to traditional barriers. Unfortunately, as noted above, these solutions are expensive, and time consuming to install. Additionally, misapplication or incomplete coverage of the physical shielding can still permit RF signal leakage through the physical barriers, thereby rendering the shielding ineffective. As such, these shielding techniques are often neither generally feasible nor practical. Consequently, neither the use of higher power, nor the addition of physical or electromagnetic shielding has proven to be a viable solution to the aforementioned problems associated with a missed RFID tag in a carton or container.

Additionally, one of the goals of using a RFID tunnel system is to provide granularity and selectivity per specific carton or container processed by the RFID tunnel system.

Therefore, unintentional RFID reads of adjacent RFID tagged items contained in cartons that are upstream or downstream from the intended carton under scrutiny defeats the intention of discrete RFID tunnel scanning. Further, cartons that are determined to be in error in an automated RFID read environment typically get diverted for further forensic analysis to determine the cause of the error (e.g., missing RFID tagged items, inaccurate item counts, etc.). While it has been proven that recirculation of those cartons falling short of expected item RFID read counts has a positive result in reducing the number of cartons diverted to exceptions handling (e.g., for physical or manual inspection), recirculation has its own drawbacks. More specifically, recirculating a carton or container for a second RFID read can significantly and negatively impact the total throughput volume within a RFID tunnel conveyance infrastructure, and has the potential to push known RFID conveyer designs beyond their peak capacity. Accordingly, it is desirable to reduce the number of cartons or containers that are recirculated through the RFID tunnel for a second or third possible RFID read.

Consequently, there is a long felt need in the art for a method of improving the accuracy of RFID tag interrogations in an RFID tunnel environment. Further, there also exists in the art a long-felt need for a method of optimizing a RFID tunnel system with a supplemental read solution to successfully read difficult to read RFID inlays/tags that are packaged among other RFID inlays/tags within a specific carton or container while minimizing the number of cartons/containers that must be recirculated for a subsequent RFID read. Finally, there is a long-felt need in the art for a method of optimizing a RFID tunnel system with a supplemental read solution to successfully read difficult to read RFID inlays/tags that are packaged among other RFID inlays/tags within a specific carton or container while minimizing the number of cartons/containers that must be manually inspected. Moreover, there is also a long-felt need to improve the read accuracy of the RFID inlays/tags while ensuring that no damage is caused to any of the RFID inlays/tags due to constant change in the orientation of each of the cartons or containers containing densely packed RFID inlays/tags, even while ensuring that significant amount of time is not lost in ensuring 100% read accuracy of the RFID inlays/tags.

The method of the present invention allows for the supplemental use of software filtering techniques and smart decision-making processes to utilize a secondary RFID tunnel read to achieve a higher RF read percentage without the impact that recirculation causes in normal production flow. The present method is especially suitable for inventorying containers holding a relatively large number of RFID tagged items that are in close proximity to one other, for example, a large number of relatively small products with RFID tags attached thereto and placed in a carton.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a method for recovering missed RFID tagged items contained in one or more cartons or containers being passed through a dynamic RFID tunnel environment. The method of the present invention uses supplemental software filtering techniques and intelligent decision-making processes to utilize read to achieve a higher success rate in terms of RFID read percentage of RFID inlays/tags located within one or more cartons or containers without the negative impact that recirculation of the containers for a subsequent RFID read causes in normal production flow.

In one embodiment of the present invention, a method of inventorying one or more containers is disclosed. The method utilizes a dynamic RFID tunnel system comprising a first RFID tunnel and a second RFID tunnel located along a conveyer apparatus. To perform an inventory, the one or more containers is placed on the conveyer apparatus and moved into the first RFID tunnel where a first RFID read of the container is performed. The first RFID read is then compared to a database containing an expected inventory of the one or more containers. If the first RFID read of the one or more containers matches the expected inventory, the one or more containers moves along the conveyer through the second RFID tunnel and then exits the conveyer apparatus without any additional or subsequent reads.

If, on the other hand, the first RFID read of the one or more containers does not match the expected inventory number stored in the database, then the one or more containers moves along the conveyer through the second RFID tunnel where a second RFID read may be performed by moving the one or more containers through the second RFID tunnel at a slower speed as compared to their passage into the first RFID tunnel or at a higher RF read power as compared to the first RFID tunnel. The second RFID read is then compared to the database containing the expected inventory of the one or more containers. If the second read of the one or more containers matches the expected inventory, the one or more containers moves along the conveyer and exits the conveyer without any additional or subsequent reads. Alternatively, if the second RFID read of the one or more containers does not match the expected inventory, the one or more containers may be recirculated through the RFID tunnel system or diverted for a manual inspection.

In an alternative embodiment of the present invention, a method for inventorying the RFID tagged contents of one or more containers using a dynamic RFID tunnel system comprising a first and a second tunnel is disclosed. The one or more containers housing the RFID tagged items is first moved into the first tunnel where a first RFID read is performed. The first RFID read is then compared to an expected inventory of the containers' contents contained in a database. If the first RFID read of the one or more containers matches the expected inventory, the one or more containers moves along the conveyer through the second tunnel and then exits the conveyer without any additional RFID reads. If, on the other hand, the first RFID read of the one or more containers does not match the expected inventory, the one or more containers moves along the conveyer through the second tunnel where a second RFID read may be performed either by moving the one or more containers through the second tunnel at a slower speed as compared to the first tunnel or by having a RF read power higher than that of the first tunnel. The second RFID read is then compared to the expected inventory of the one or more containers from the database. If the second RFID read of the one or more containers matches the expected inventory, the containers move along and exit the conveyer. Alternatively, if the second RFID read of the one or more containers does not match the expected inventory, the containers may be recirculated through the dynamic RFID tunnel system for a subsequent RFID read. If the expected inventory is still not matched after the recirculation, the one or more containers are then diverted to an exceptions audit area for a manual inspection.

In an alternative embodiment of the present invention, a method for recovering missed RFID tagged items in one or more containers using a dynamic RFID tunnel system comprising a first and a second tunnel is disclosed. The container is moved into the first tunnel where a first RFID read is performed. The first RFID read is compared to an expected inventory of the one or more containers. If the first RFID read of the one or more containers matches the expected inventory, the containers move along the conveyer through the second tunnel and then exits the conveyer without any additional reads. If, on the other hand, the first RFID read of the one or more containers does not meet or exceed the expected inventory by a predetermined threshold number, the containers move along the conveyer and is diverted to an exceptions processing area for manual inspection and/or verification.

If, on the other hand, the first RFID read of the one or more containers is less than the expected inventory by less than the predetermined threshold number, the containers move along the conveyer through the second tunnel where a second RFID read is performed either by moving the one or more container through the second tunnel at a slower speed as compared to the first tunnel or by reading at a higher RFID read power as compared to the first tunnel. The second RFID read is then compared to the expected inventory of the containers. If the second RFID read of the one or more containers matches the expected inventory, the containers move along and exits the conveyer. Alternatively, if the second RFID read of the containers does not match the expected inventory, the containers is recirculated through the dynamic RFID tunnel system for a subsequent read or reads. If the expected inventory is still not matched after the recirculation, the containers may then be diverted to the exceptions audit location for manual inspection and/or verification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

DETAILED DESCRIPTION

Figure 1:
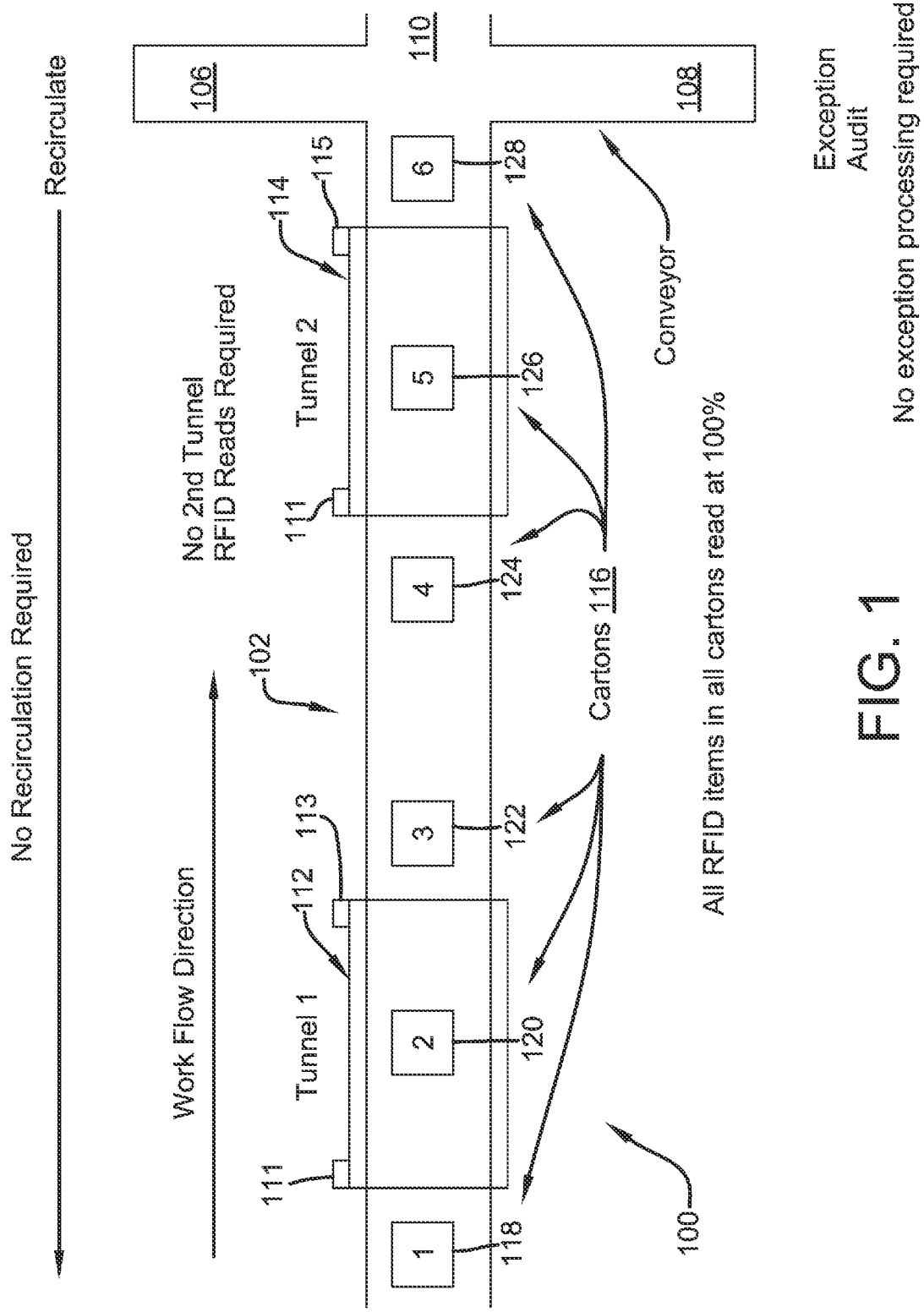
FIG. 1 illustrates an overhead view of a dynamic RFID tunnel system for use in recovering missed RFID tagged items in a dynamic RFID tunnel environment and in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

When cartons or other containers containing RFID tagged items are inventoried using a conveyer and an RFID reader tunnel system, the RFID readers oftentimes fail to read or miss one or more RFID tagged items or inlays passing through the RFID reader tunnel due to the high volume of items to be read and/or the speed of the conveyor. For example, increasing the conveyer speed to increase product throughput oftentimes does not provide the RFID reader with enough time to energize all of the RFID inlays as they pass through the RFID reader tunnel. Further, RFID readers having lower power systems are typically utilized to allow for selectivity of specific containers or cartons which could also result in missed RFID reads, and using higher power settings can result in errors and unintended reads. Additionally, the use of physical or electromagnetic shielding is typically impractical for the reasons stated above.

As explained above, the failure to accurately identify and read all RFID tagged items in a container as it passes through an RFID tunnel reader system oftentimes results in the need to divert the container to an inspection station for a manual inspection, which is both time consuming and inefficient and can lead to production delays. Therefore, there exists in the art a long felt-need to increase the percentage of RFID tagged items successfully interrogated when a relatively large number of RFID tagged items are placed in close proximity to one another in a confined space, such as when packed in a container, and wherein such containers are circulated along conveyor apparatuses used in production lines and the like.

Typically, a basic shipping carton, container or other box or volume containing a plurality of RFID tagged items is presented to a reader system (e.g., an RFID reader tunnel system) to be inventoried. The container can be any suitable container as is known in the art for housing, storing and/or shipping items, such as a cardboard or wooden box. Further, the carton can be any suitable size, shape, and/or configuration as is known in the art without affecting the overall concept of the invention. The carton will house or contain a relatively large number and/or a high density of RFID tagged items in relatively close proximity to one another, thus the carton can be referred to as a high density box or other such nomenclature. Obviously, it is desirable when scanning or interrogating a carton to detect all of its contents; in this case, 100% of RFID tagged items located within the carton. However, the primary challenge in using any RFID reader system is the inability to capture all of the RFID inlay/transponders applied to each individual item within a given container. Container spacing on the conveyor, speed of the conveyer equipment, and the power supplied by the RFID reader make it difficult to achieve a 100% read rate without creating over-read conditions where inlays from adjacent containers upstream or downstream from the intended container are read as well. On the other hand, and as described in greater detail above, failing to read all of the RFID tagged items in a container presents its own challenges.

The present invention discloses a method for successfully inventorying contents tagged with RFID inlays in one or more containers that are typically moved for circulation in production lines. Typically, the containers move through a dynamic RFID tunnel system via a conveyor apparatus or other material handling mechanisms as are known in the art. The dynamic RFID tunnel system may comprise a plurality of tunnels in series. Each tunnel is an enclosure or apparatus configured to integrate with the conveyer apparatus comprising an RFID antenna that projects radio frequency energy to create a read zone for an RFID reader. Particularly, each tunnel is designed to scan the containers passing therethrough and moving on the conveyor apparatus. RFID tags within the carton are energized and read by the RFID reader while in the read zone, and signals are transmitted back to the RFID reader that transmit or convey the information stored in the RFID tags. The method allows a user to inventory the RFID tagged contents of the containers without the need for a user to have to physically open the containers to verify the contents, which is both time-consuming and inefficient and results in unwanted production delays.

Turning now to the drawings, FIG. 1 illustrates an overhead view of a dynamic RFID tunnel system 100 for use in scanning one or more containers or cartons 116. The tunnel system 100 comprises a conveyer 102, a first RFID tunnel 112 having a RFID reader 113, and a second RFID tunnel 114 having a RFID reader 115, wherein said first and second RFID tunnels 112, 114 may be positioned in series along conveyor 102 and are capable of interrogating RFID tags that pass through said tunnels 112, 114. More specifically, the tunnel system 100 is a dynamic RFID tunnel system that comprises a plurality of RF transmitting systems (in the form of RFID readers 113, 115) that perform first and possibly second RFID reads by scanning the one or more containers 116 for contents tagged with RFID transponders in an automated manner as they pass through said RFID tunnels 112, 114.

The conveyer 102 comprises a main pathway 104, a recirculating pathway 106, an exception audit pathway 108, and an exit 110. The one or more containers 116 may be any number of containers that can be placed in conveyor at any given time, but number from one to six, 118, 120, 122, 124, 126, and 128 respectively, in FIG. 1 only for exemplary purposes. Each of the one or more containers 116 contains one or more items with a corresponding RFID tag associated therewith, and enters the dynamic RFID tunnel system 100 via the main pathway 104 for interrogation by RFID readers 113, 115, and/or evaluation. In FIG. 1, all of the RFID tags in the one or more containers 116 are successfully read in first RFID tunnel 112 by the method described below, and there is no need to perform a second RF interrogation or read of the one or more cartons 116 in the second RFID tunnel 114 or to divert any of the plurality of cartons 116 to the exception audit space (not shown) via pathway 108 for manual inspection.

Figure 6:
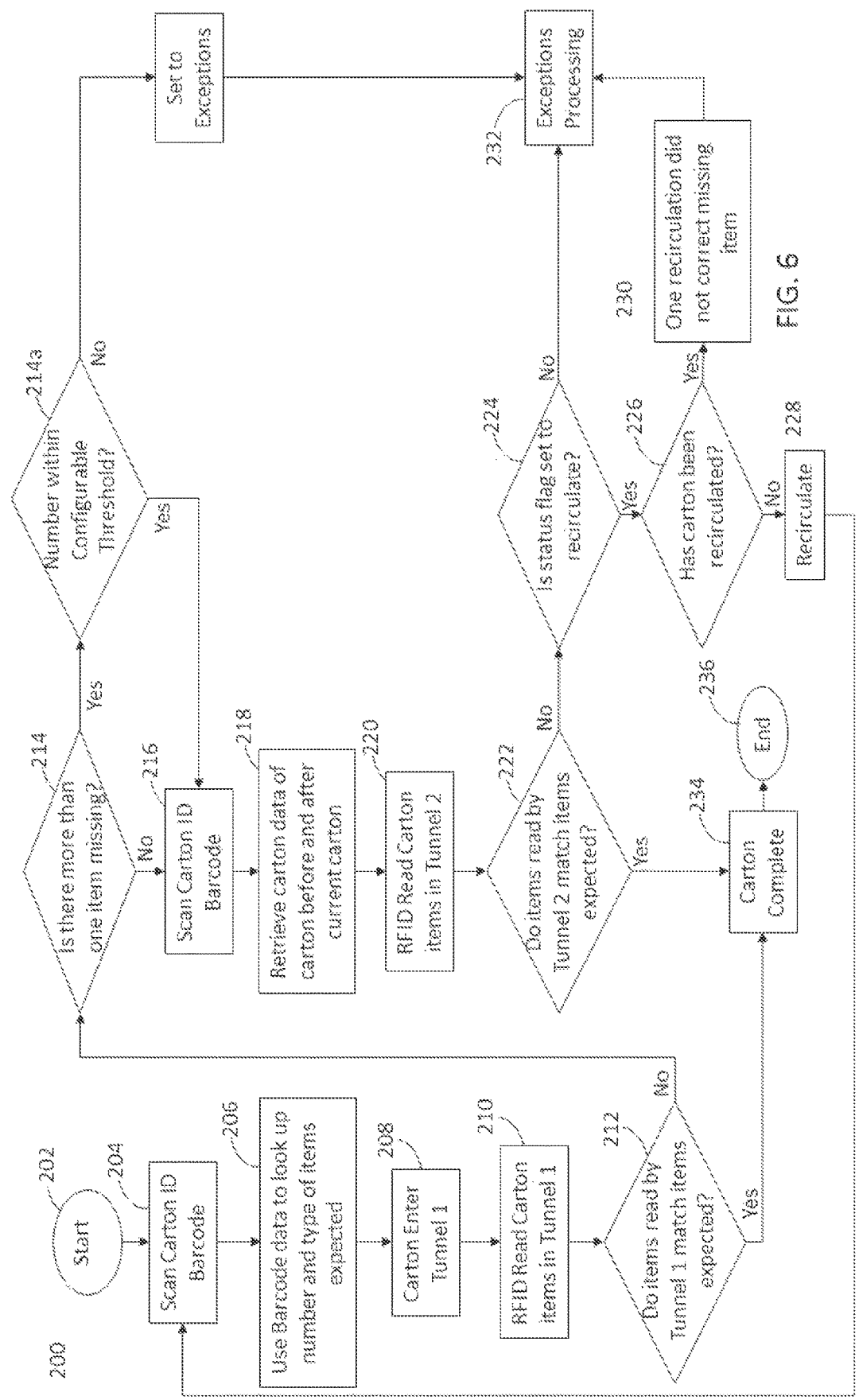
FIG. 6 illustrates a schematic diagram of one possible embodiment of a method of recovering missed RFID tagged items in a dynamic RFID tunnel environment using the dynamic RFID tunnel system in accordance with the disclosed architecture.

FIG. 6 illustrates a method of inventorying any of the one or more containers 116 using the dynamic RFID tunnel system 100. More specifically, the method 200 begins at step 202 wherein the container 116 is placed on the main pathway 104 of the conveyer 102. At step 204, a barcode on container 116 may be scanned by a barcode scanner 111. While specific reference is made to barcode/barcode scanners herein by way of example, it is contemplated that other technologies can also be used such as, without limitation QR codes/scanners, RFID tags/readers, etc. The barcode scan may then be used to identify the container 116, and information about its contents at step 206. For example, the barcode data can be crosslinked to a database that contains a description and quantity of the RFID tagged contents of the container 116. The database may also contain additional information such as, without limitation, UPC/ASN or other product designators that identify the RFID tagged items by type, SKU, color, etc.

After the container 116 has been linked to the appropriate database, at step 208 the container 116 enters first RFID tunnel 112 via conveyor 102 and a first interrogation/read of the contents of container 116 is performed at step 210 by RFID reader 113. More specifically, once the container 116 enters the first RFID tunnel 112 via the conveyer 102, ideally, any RFID tags housed within container 116 will be energized and read by RFID reader 113 within the first tunnel 112. As said RFID tags items are being read, RF signals are transmitted back to the RFID reader 113 to transmit any information that the RFID tags may contain such as, without limitation, the quantity of the RFID tags successfully read.

At step 212, the results of the first read are then compared to the database to determine if the data from the first read matches the expected inventory of container 116, as reported in the database. If the first read matches the expected inventory number set forth in the database, the user is notified that a match exists at step 234, and the process exits at step 236. If, on the other hand, the first read does not match the expected inventory of container 116 as reported in the database at 212, a determination is made at step 214 as to the difference between the two quantities. If the difference in reported and expected quantities is only one, then at step 216, a barcode scan is performed on the containers positioned immediately before and after container 116, and information about said container is obtained from the database at step 218.

On the other hand, if the difference in reported and expected quantities is more than one, then a determination is made at step 214a as to whether the number of "missing" (i.e., not read) items from container 116 is within a user-specified threshold. If the discrepancy is within this threshold, then the process returns to step 216 and proceeds accordingly. If, on the other hand, the number of missing items is more than the user-specified threshold, the container 116 proceeds to exceptions processing at step 232 for physical inspection. Although the embodiment illustrated by FIG. 6 depicts a method in which a user specifies a threshold of missing items that must be met before container 116 will be sent to exceptions processing, in other embodiments, a user may not specify such a threshold and the container 116 will proceed to exceptions processing 232 if it is determined that more than one item is missing at step 214.

At step 220, a second read of container 116 is then performed by RFID reader 115 in second RFID tunnel 114, wherein the second RFID tunnel 114 performs a second read with the one or more containers moving into the second RFID tunnel at a speed slower than that moved into the first RFID tunnel 112. Alternatively, the second read may be performed in the second RFID tunnel 114 at a higher RF read power than the first RFID tunnel 112. At step 222, the results of the second read are then compared to the database to determine if the data from the second read matches the expected inventory of container 116, as reported in the database. If the second read matches the expected inventory number set forth in the database, the user is notified that a match exists at step 234, and the process exits at step 236. Allowing the one or more containers to move into the second RFID tunnel at a speed slower than a speed of the movement of the containers into first RFID tunnel ensures that the RFID inlays/tags get sufficient time for exposure to the RFID reader, thereby allowing the reader to pick up items that were missed in the first read. Moreover, by ensuring that the speed of movement of the containers into second RFID tunnel is slowed down only when there is a mismatch, it is possible to maintain a sufficiently fast paced production line without compromising on the inventory of contents of the different containers.

If a mismatch occurs for a second time, however, a determination of whether the process has been selected by a user to recirculate the container 116 is made at step 224. If recirculation is selected, a determination of whether the container 116 has previously been recirculated is made at step 226. If the container 116 has not previously been recirculated, then the container 116 is recirculated at step 228 by redelivering the container to the start of RFID tunnel system 100 and repeating the process, beginning at step 204. By recirculating the container 116, movement of the container 116 on a conveyor, or otherwise, throughout a facility may slightly displace or jostle the contents contained therein. As a result, subsequent reads of the container may identify an item that was previously missed. Advantageously, this avoids the need to physically inspect or inventory the contents of container 116. Additionally, since recirculation is performed by maintaining the stability and the upright orientation of the containers, it is ensured that no damage is caused to the items within the containers.

If, however, one recirculation of the container 116 did not correct the mismatch (i.e., between the items detected and the items expected) at step 230, the container 116 proceeds to exceptions processing at step 232 for physical inspection. Although the method illustrated in FIG. 6 depicts sending the container 116 to exceptions processing after one recirculation, a user may set the parameters of the system to recirculate a container 116 any number of times. For example, a container may be recirculated through the dynamic RFID tunnel system two or more times, three or more times, four or more times, five or more times, or any number of times before being sent to exceptions processing for physical inspection.

Returning to the determination at step 224, if recirculation is not selected at step 224, then container 116 proceeds directly to exceptions processing at step 232 for physical inspection.

In summary, it is possible to take the results of the first read/interrogation of the container 116 and determine if a second read/interrogation is required due to a mismatch between the information retrieved from the database as compared to the data from the first read. Further, logic may be applied that states that if the container 116 is only one or two items (or some other user-specified number) short, there is a high degree of probability that the container 116 is most likely complete, but failed to read all of the RFID inlays on the items of that specific container 116.

Conversely, if the first read of the container 116 demonstrates that a threshold number of items, say five or more for example, are missing, there is a very high probability that there is a significant quantity of items that simply do not have RFID tags attached to the items in the container 116, and that container 116 will require a manual evaluation of its contents at the exceptions audit space. However, if the data from the first read matches the expected inventory of the container 116, the container 116 is marked or flagged as "good" or complete at step 234 and the process exists at step 236 as the container 116 passes through the second RFID tunnel 114 without a second read, and exits the conveyer 102 at pathway 110.

Figure 2:
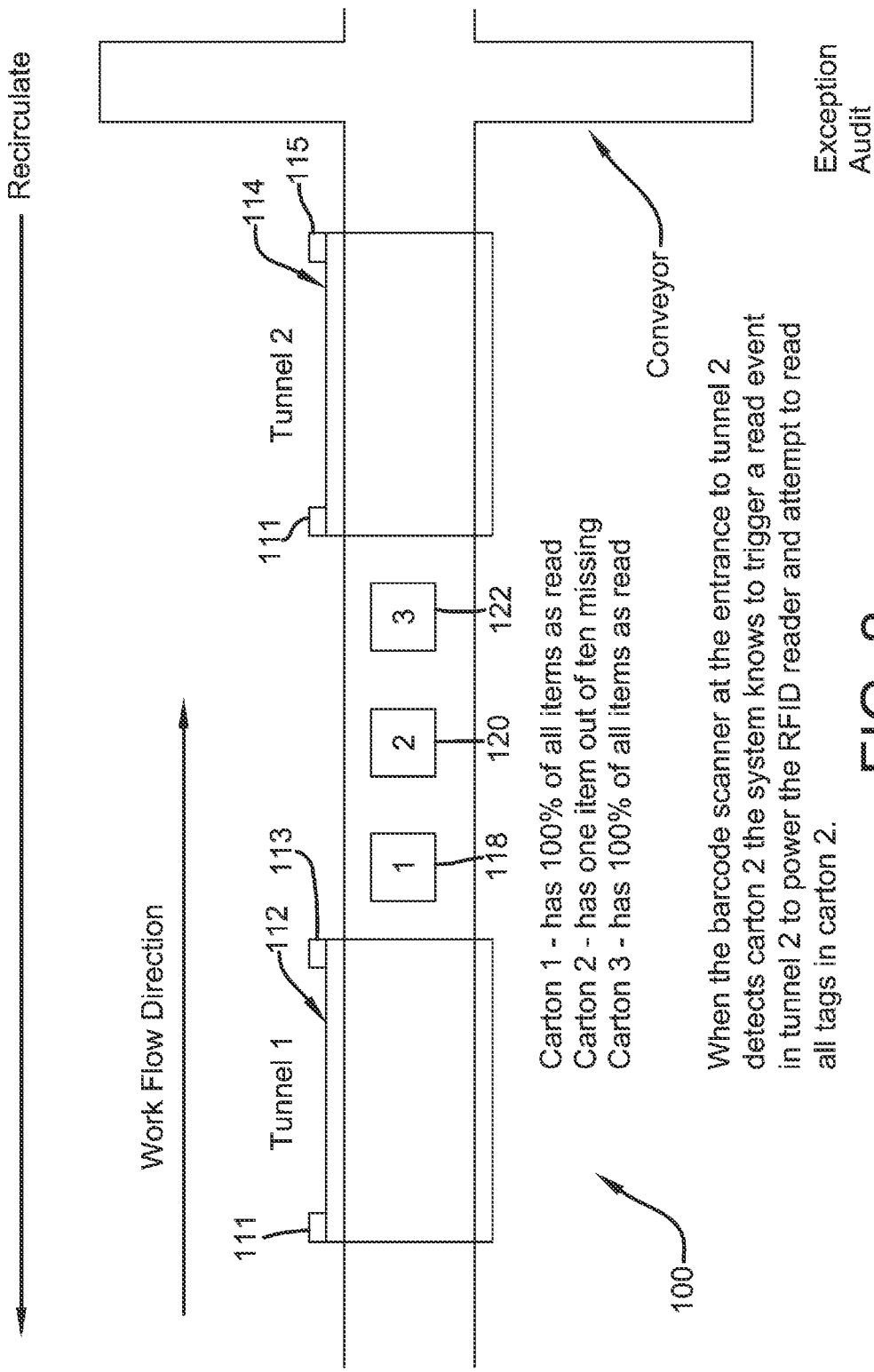
FIG. 2 illustrates an overhead view of the dynamic RFID tunnel system of FIG. 1 for use in recovering missed RFID tagged items in a dynamic RFID tunnel environment and in accordance with the disclosed architecture, and wherein carton 2 is missing RFID tagged items.

Returning now to the drawings, FIG. 2 illustrates an overhead view of the RFID tunnel system 100 of FIG. 1 for use in recovering missed RFID tagged items in an RFID tunnel environment, wherein it is determined that 100% of the RFID tagged items in cartons 1 (118) and 3 (122) have been successfully read, and further wherein carton 2 (120) is missing one RFID tagged item. More specifically, carton 2 passes through the first RFID tunnel 112 and is interrogated by RFID reader 113. If the first read of carton 2 determines that the item count is short in evaluation by one RFID tagged item, carton 2 proceeds on conveyer 102 along the main pathway 104 to the second RFID tunnel 114 and RFID reader 115, as described in relation to step 214 above.

At the second RFID tunnel 114, a scan of the container barcode is performed by a second barcode scanner 111, as described in step 216 above. The scan is used to identify carton 2 (120) and to trigger a second read event in the second tunnel 114 by RFID reader 115 and to retrieve data on the cartons immediately before and after carton 2, namely carton 1 (118) and carton 3 (122), as described in step 218 above. The barcode scan is also used to look up the status of carton 2 (120) at the conclusion of the first read.

Figure 5:
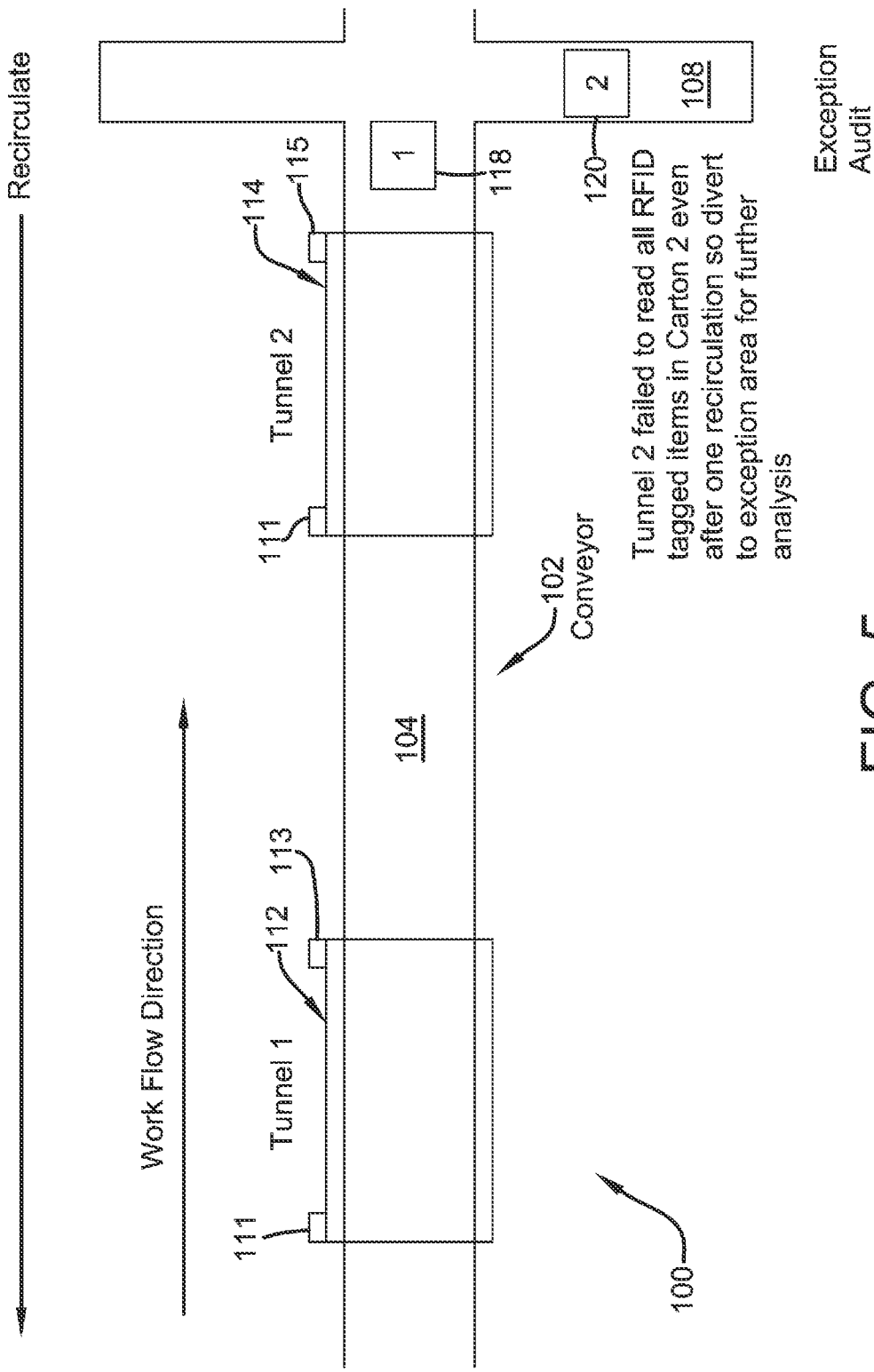
FIG. 5 illustrates an overhead view of the dynamic RFID tunnel system of FIG. 1 for use in recovering missed RFID tagged items in a dynamic RFID tunnel environment in accordance with the disclosed architecture and wherein carton 2 is diverted to an exception audit space for manual inspection.

If the first read matches the expected inventory of carton 2 (120), carton 2 is flagged as "good" and proceeds to the exit 110. If, on the other hand, the first read of carton 2 does not match the expected inventory, carton 2 is flagged as being in "error" and a further determination is then made. For example, if carton 2 is a known quantity miss (i.e., the correct product is read, but the wrong quantity), then carton 2 may be flagged as "second" and would then proceed for a second read in the second tunnel 114 by RFID reader 115 (see e.g., FIG. 3). By comparison, if carton 2 is flagged as being "bad" (i.e., the carton contains the correct product count, but the wrong product), carton 2 will be diverted to an exceptions processing area via the exceptions audit pathway 108 for manual evaluation without a second RFID read. By further comparison, if the status flag for carton 2 is set to "divert" (i.e., the first read indicated that a significant number of RFID tagged products are missing from carton 2), carton 2 will be diverted to the exceptions processing via the exceptions audit pathway 108 for manual evaluation without a second read, as illustrated in FIG. 5.

Figure 3:
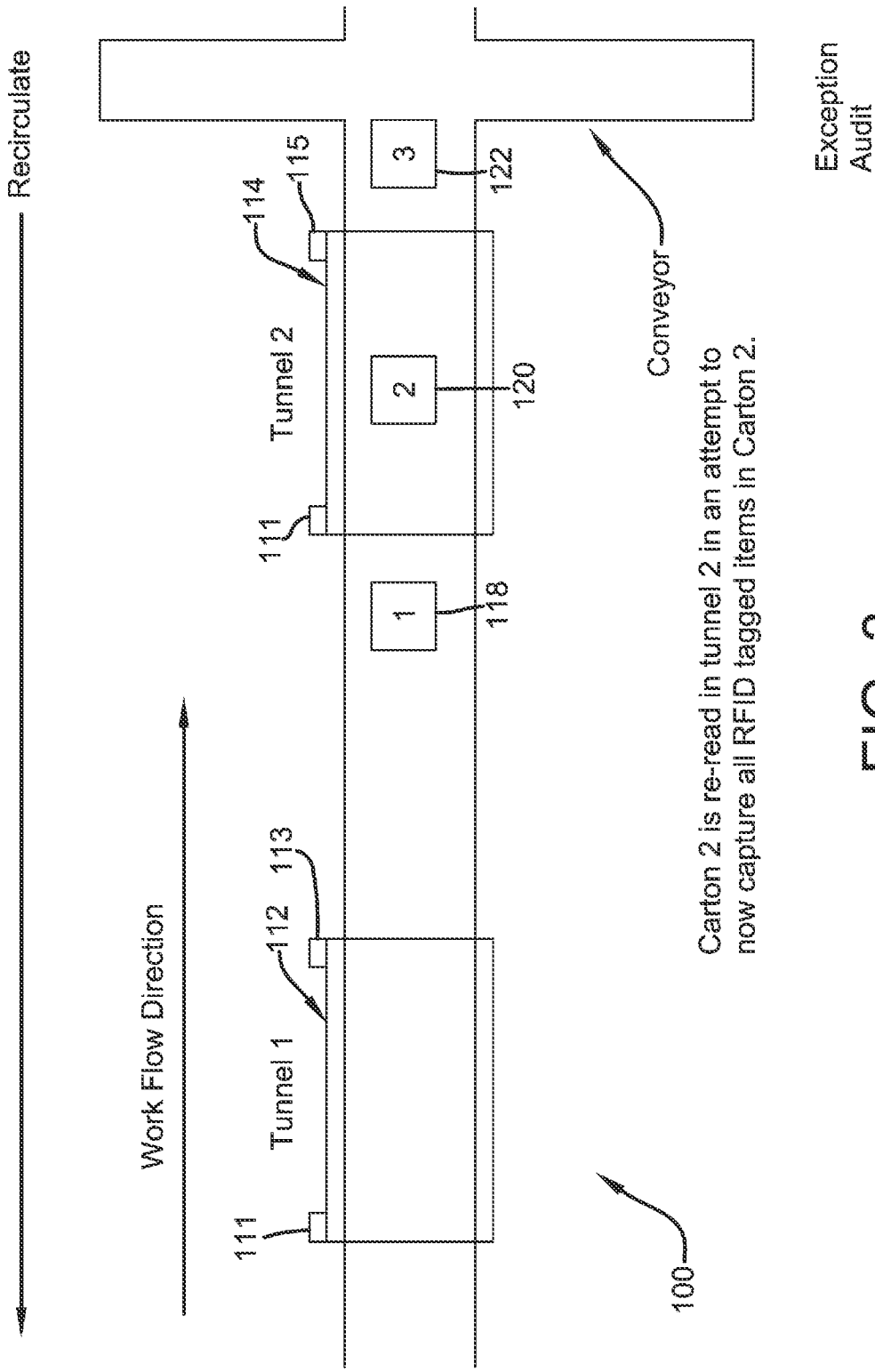
FIG. 3 illustrates an overhead view of the dynamic RFID tunnel system of FIG. 1 for use in recovering missed RFID tagged items in a dynamic RFID tunnel environment in accordance with the disclosed architecture, and wherein a subsequent read of carton 2 is performed in the second tunnel.

FIG. 3 illustrates an overhead view of the RFID tunnel system 100 of FIG. 1 for use in recovering missed RFID tagged items in an RFID tunnel environment, and wherein a subsequent read of carton 2 is performed in the second tunnel. More specifically, carton 2 (120) moves into the second RFID tunnel (as described in step 220 above) and a second RFID read is performed by RFID reader 115, preferably at either a higher RF power setting than that of the first read if the status flag is set to "second" (thereby indicating that the first read found one, or possibly two, RFID tagged items missing). Alternatively, the second read may be performed at the second tunnel 114 by moving the one or more containers into the second tunnel 114 at a speed slower than that at which the containers were moved into the first RFID tunnel. Stated differently, the higher power setting in the second RFID tunnel 114 or the slower movement of the containers into the second RFID tunnel 114 allows for the potential to energize any RFID inlays/tags previously missed in the first read by RFID reader 113. This approach differs from the first read in that the higher RF power setting or the slower movement setting is not an initially desirable attribute of the solution, as a very discrete RF field is required to achieve the desired container granularity of the containers while they continue to move through the conveyer at a significantly fast pace. While the higher reader power of the second read could possibly energize extraneous and unintended inlays, this method 200 overcomes this deficiency as discussed infra.

The second read is triggered at the second RFID tunnel 114 and an attempt is made to capture all RFID tags or inlays, as indicated by the expected inventory from the database. The second read is then compared to the expected inventory. If the expected inventory matches the second RFID scan, the flag is set to "good" and carton 2 would be marked complete at step 234 and exits the tunnel system 100 at step 236. If carton 2 fails to match the expected inventory after the second read, the flag is set to "recirculate" and carton 2 (120) may then be recirculated through the tunnel system 100 following the recirculation pathway 106 and the method 200 repeats.

If, on the other hand, carton 2 (120) has more than one RFID tagged items missing after passing the first read in the first RFID tunnel 112, at step 214, carton 2 is compared to a configurable threshold number at step 214a. The configurable threshold number may be any number selected by the user and may depend on the amount and type of inventory, but for purposes of this example, is five items. So, at step 214a, if the first read is below the configurable threshold number (e.g., five), the carton 2 proceeds to step 216 where the second read is triggered in the second RFID tunnel 114. If the expected inventory matches the second scan, the flag is reset to "good" and carton 2 (120) is marked complete at step 234, and exits the tunnel system 100 at step 236. If, on the other hand, carton 2 (120) fails to match the expected inventory after the second read, carton 2 may then be recirculated through the tunnel system 100 following the recirculation pathway 106 and the method 200 repeats. Alternatively, carton 2 may be diverted to the exceptions processing area at step 232 if so desired.

If carton 2 is missing more than the configurable threshold number after the first read at step 214a, carton 2 is diverted to the exceptions processing area at step 232 along the exceptions audit pathway 108 for a manual evaluation. Similarly, if carton 2 is flagged as "bad" because, for example, the first read identified the proper item count but the wrong items were detected when compared to those expected, carton 2 is diverted to the exceptions processing area at step 232 along the exceptions audit pathway 108 for a manual evaluation.

Figure 4:
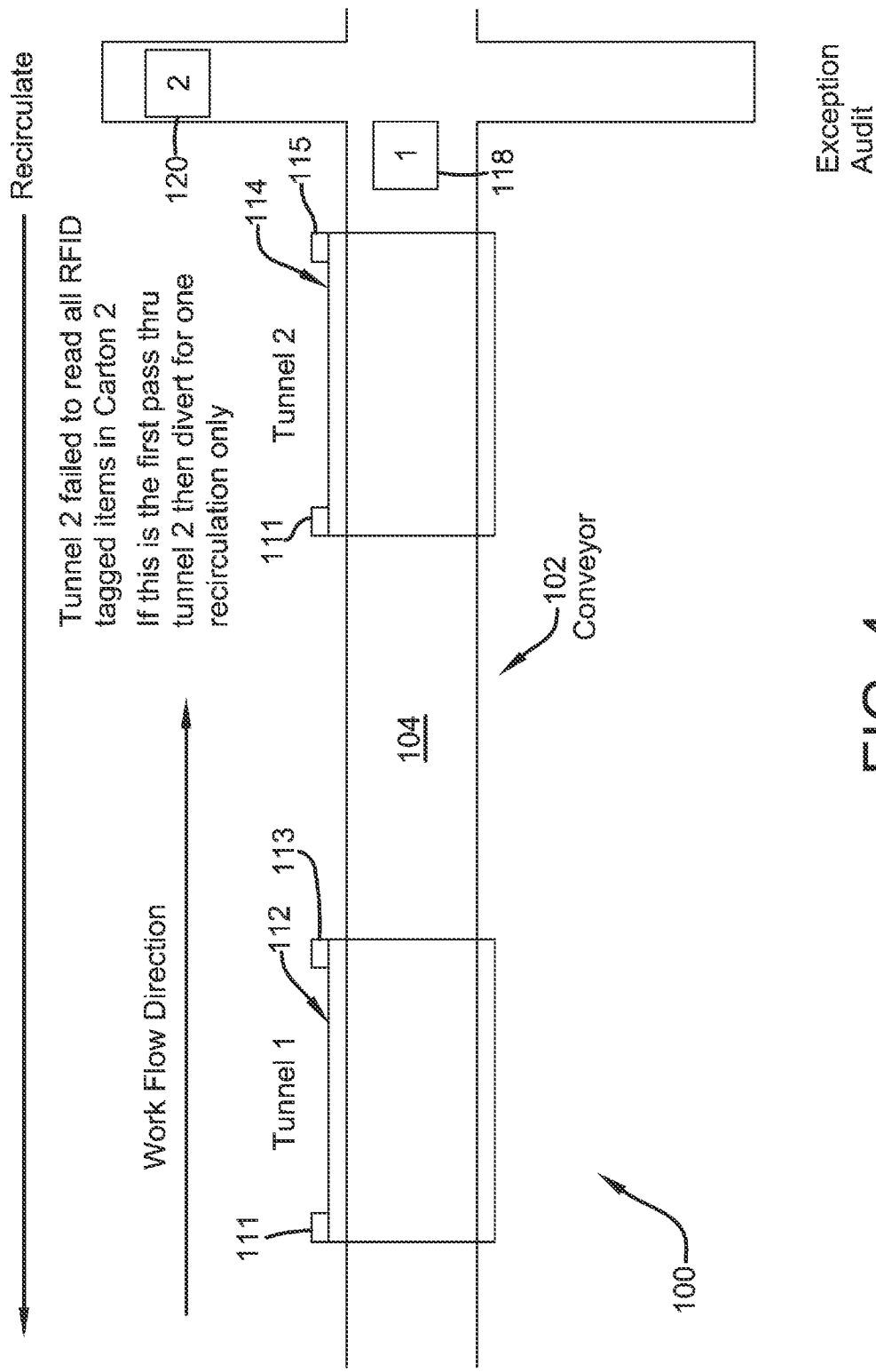
FIG. 4 illustrates an overhead view of the dynamic RFID tunnel system of FIG. 1 for use in recovering missed RFID tagged items in a dynamic RFID tunnel environment in accordance with the disclosed architecture, and wherein carton 2 is recirculated for a subsequent RFID read.

FIG. 4 illustrates an overhead view of the dynamic RFID tunnel system 100 of FIG. 1 for use in recovering missed RFID tagged items in an RFID tunnel environment, and wherein carton 2 is recirculated for a subsequent RFID read. More specifically, if carton 2 (120) fails to match the expected inventory after the second read it may be recirculated through the tunnel system 100. The carton 2 is moved to the recirculation pathway 106, and the method 200 repeats. If carton 2 recirculates a second time through the tunnel system 100 and the second read still does not match the expected inventory at step 222 and the flag is set to "recirculate" at step 224, the carton 2 is diverted to the exceptions processing area at step 232 along the exceptions audit pathway 108 for a manual evaluation.

This technique recognizes that due to the nature of the second RFID reader 115 operating at a different power level (i.e., a higher RF power level than the first RFID reader 113), it is possible to have overreads of RFID tagged items from the containers 116 upstream or downstream of the currently interrogated container 116, depending on the spacing between the respective containers 116 (i.e., the closer the containers, the more likely an overread will occur). However, the reference of what is considered accurate has not changed from the first RFID tunnel 112. If the containers immediately ahead of and immediately behind the current container are marked as "good," they have been deemed to be completed from the first RFID tunnel scan. And, when the current carton 116 is interrogated for a second time in the second RFID tunnel 114 by second RFID reader 115, and all RFID tagged items found that meet the criteria of what makes the container whole, then the container 116 is also considered complete and will exit the system without the need for any exception handling.

FIG. 5 illustrates an overhead view of the RFID tunnel system 100 of FIG. 1 for use in recovering missed RFID tagged items in an RFID tunnel environment, wherein carton 2 (120) is diverted to an exception audit space for manual inspection. As explained above, this outcome may result if the second read in RFID tunnel 114 fails to read all RFID tagged items in carton 2 even after one recirculation.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of inventorying one or more containers of RFID tagged items using a dynamic RFID tunnel system comprising at least a first RFID tunnel and a second RFID tunnel, the method of inventorying comprising the steps of:
  performing a first read of the one or more containers at the first RFID tunnel;
  comparing the first read to a database;
  performing a second read of the container at the second RFID tunnel if the comparison of the first read to the database does not match, wherein the second RFID tunnel performs the second read with the one or more containers moving into the second RFID tunnel at a speed slower than a speed of movement of the containers into the first RFID tunnel; and comparing the second read to the database.

2. The method of claim 1, wherein the RFID tunnel system comprises at least one RFID reader for performing the first and second reads.

3. The method of claim 1, wherein the database contains an expected inventory of the RFID tagged items in the one or more containers.

4. The method of claim 1, further comprising the step of recirculating the one or more containers through the dynamic RFID tunnel system if the comparison of the second read to the database does not match.

5. The method of claim 1, wherein the second read is performed at a higher RFID reader power level than the first read.

6. The method of claim 1, wherein the one or more containers move through the dynamic RFID tunnel system via a conveyer apparatus.

7. The method of claim 6, wherein the conveyer apparatus is integrated with the first RFID tunnel and the second RFID tunnel.

8. The method of claim 6, wherein the one or more containers move through the dynamic RFID tunnel system in an upright condition.

9. A method of inventorying one or more containers of RFID tagged items using a dynamic RFID tunnel system, comprising at least a first RFID tunnel and a second RFID tunnel, the method of inventorying comprising the steps of:

moving the one or more containers through the first RFID tunnel;

performing a first read of the one or more containers within the first RFID tunnel;

determining if the first read matches an expected inventory of the one or more containers;

moving the one or more containers through the second RFID tunnel;

performing a second read of the one or more containers within the second RFID tunnel if the first read did not match the expected inventory of the one or more containers, wherein the second read is performed with the one or more containers moving into the second RFID tunnel at a speed slower than a speed of movement of the containers into the first RFID tunnel; and determining if the second read matches the expected inventory of the one or more containers.

10. The method of claim 9, wherein the second read is performed at a higher reader power than the first read.

11. The method of claim 9, further comprising the step of configuring a threshold number of missing items from the one or more containers.

12. The method of claim 9, further comprising the step of diverting the one or more containers to an exceptions audit if the comparison of the second read does not match the expected inventory of the one or more containers.

13. The method of claim 9, further comprising the step of recirculating the one or more containers through the dynamic RFID tunnel system if the comparison of the second read does not match the expected inventory of the one or more containers.

14. A method of recovering missed RFID tagged items in one or more containers using a dynamic RFID tunnel system comprising at least a first RFID tunnel and a second RFID tunnel, the method comprising the steps of:

performing a first read of the one or more containers in the first RFID tunnel;

determining if the first read matches an expected inventory of the one or more containers; and performing a second read of the one or more containers in the second RFID tunnel, at a higher RFID read power as compared to the first read, if the first read is within a selected threshold number of the expected inventory; and determining if the second read matches the expected inventory of the one or more containers;

wherein the second read is performed in the second RFID tunnel by moving the one or more containers into the second RFID tunnel at a speed slower than a speed of movement of the one or more containers into the first RFID tunnel for performance of the first read.

15. The method of claim 14, further comprising the step of recirculating the one or more containers through the dynamic RFID tunnel system if the second read is within the selected threshold number of the expected inventory.

16. The method of claim 14, further comprising the step of diverting the one or more containers to an exceptions audit if the first read is not within the selected threshold number of the expected inventory.

17. The method of claim 14, further comprising the step of diverting the one or more containers to an exceptions audit if the comparison of the first read to the expected inventory of the one or more containers indicates an unexpected inventory is present in the containers.

18. The method of claim 14, further comprising the step of moving the one or more containers out of the dynamic RFID tunnel system if either the first or the second reads match the expected inventory of the one or more containers.

* * * * *